US007496538B2

(12) United States Patent
Bleumer

(10) Patent No.: US 7,496,538 B2
(45) Date of Patent: Feb. 24, 2009

(54) FRANKING METHOD AND APPARATUS

(75) Inventor: Gerrit Bleumer, Velten (DE)

(73) Assignee: Francotyp-Postalia AG & Co, Birkenwerder (DE)

( * ) Notice: Subject to any disclaimer, the term of this patent is extended or adjusted under 35 U.S.C. 154(b) by 1956 days.

(21) Appl. No.: 09/728,741

(22) Filed: Dec. 1, 2000

(65) Prior Publication Data

US 2002/0035547 A1 Mar. 21, 2002

(30) Foreign Application Priority Data

Dec. 6, 1999 (DE) ................................ 199 58 721

(51) Int. Cl.
*G06F 17/60* (2006.01)

(52) U.S. Cl. ................................ 705/50; 705/1; 705/60; 705/62; 705/401; 705/402; 705/410

(58) Field of Classification Search .................. 101/71; 283/71; 705/62, 401, 408, 410, 50, 1, 60, 705/402, 4

See application file for complete search history.

(56) References Cited

U.S. PATENT DOCUMENTS

| | | | | |
|---|---|---|---|---|
| 4,775,246 A | 10/1988 | Edelmann et al. | ............. | 705/62 |
| 5,390,251 A | 2/1995 | Pastor et al. | .................. | 705/62 |
| 5,513,563 A * | 5/1996 | Berson | ........................ | 101/91 |
| 5,688,056 A * | 11/1997 | Peyret | ......................... | 400/61 |
| 5,768,384 A | 6/1998 | Berson | ........................ | 705/50 |
| 5,825,893 A | 10/1998 | Kara | ........................... | 380/51 |
| 5,987,441 A | 11/1999 | Lee et al. | .................... | 705/401 |
| 6,005,945 A * | 12/1999 | Whitehouse | ................. | 380/51 |
| 6,249,777 B1 * | 6/2001 | Kara et al. | .................. | 705/404 |
| 6,438,530 B1 * | 8/2002 | Heiden et al. | ............... | 705/401 |
| 2002/0035547 A1 * | 3/2002 | Bleumer | ...................... | 705/62 |
| 2002/0091545 A1 * | 7/2002 | Heiden et al. | .................. | 705/1 |

FOREIGN PATENT DOCUMENTS

| | | |
|---|---|---|
| EP | 0 686 946 | 12/1995 |
| EP | 0856816 A2 * | 8/1998 |
| WO | WO 97/24699 | 10/1997 |

OTHER PUBLICATIONS

McCooey: "Digital Stamps Promise Low-Cost Convenience"; Windows Magazine, May 1, 1999, p. 27.*
"Information Based Indicia Program (IBIP) Indicium Specification," United States Postal Service—Jun. 13, 1996.

* cited by examiner

*Primary Examiner*—Andrew J. Fischer
*Assistant Examiner*—John Winter
(74) *Attorney, Agent, or Firm*—Schiff Hardin LLP

(57) ABSTRACT

In a method and system and franking apparatus for franking postal matter and for inspection of the franking, postage fees are stored and debited in electronic form, and a fee stamp and a machine-readable date stamp containing encrypted data are applied to the postal matter. In order to satisfy high security demands to be met at a low cost, and to allow realization on a standard computer with a printer without additional hardware, an individual date stamp, distinguishable from the date stamps generated for other pieces of mail is generated for each piece of mail and is applied to the piece of mail. An inspection for multiple employment of postage fees and/or date stamps ensues on the basis of the date stamp. This inspection includes comparing a date stamp to be inspected to previously used date stamps stored in a data bank. Defrauders thus can be identified who, without paying, attempt to generate frankings or to multiply employ frankings, for example by copying.

16 Claims, 5 Drawing Sheets

FRANKING METHOD AND APPARATUS

BACKGROUND OF THE INVENTION

1. Field of the Invention

The present invention is directed to a method for franking postal matter and for checking the franking as well as a system for the implementation of such a as well as a postage meter apparatus for franking postal matter.

2. Description of the Prior Art

Like many other concerns, postal services in many countries of the world are increasingly carrying out commerce electronically, referred to as electronic commerce (e-commerce). Conventionally, large concerns use postage meter machines for franking their postal matter. Such postage meter machines are licensed to registered persons and require a specific connection to the postal service in order to be able to reload postage fees for the franking. In such a closed franking system, mechanical franking machines are reloaded with physical jetons (tokens) or the electronic postage meter machines have connections to the postal service via a special line or via the telephone line in order to be able to download postage fees from a fee computer thereat. Such postage meter machines are only sold or leased to registered customers, and an inspection by the postal service is required at regular intervals.

Since smaller companies and offices also have adequate computer capacity and printers available and an Internet connection is available in a simple and economic way, franking systems are being increasingly employed with which postage fees can be downloaded from the postal service via open networks such as the Internet and that require no special hardware subject to a regular inspection requirement. In systems referred as open franking systems, a conventional PC can be used for downloading the postage fees, and a standard printer can be used for printing a fee stamp on an envelope or on a label.

The U.S. Postal Service has specific a system architecture for open and closed franking systems. Such a system is disclosed, for example, in U.S. Pat. No. 5,825,893. Each user has a physical, theft-proof security device on which all postage fees of the user provided for the franking are stored. This security device (PSD=Postal Security Device) can be arranged inside or outside the postage meter machine or the computer. The basic items arranged in a security device are a fee counter and a user-associated encryption module with which the fee stamp and a further, machine-readable date stamp, referred to as "indicia", are generated. For franking a postal item, the security device generates such an indicium from the postage fee to be franked, and an identification code of the security device, the sender address, the current fee counter reading and, if necessary, further data with a signature code. This indicium is then encoded in a two-dimensional bar code and is printed to the postal matter, so that it can be scanned and inspected in a simple and dependable way by an evaluation device of the postal service. The internal postage fee counter of the postage meter machine is subsequently reduced (decremented) by the amount of postage that has been employed.

Since the users of open franking systems are not registered and the hardware that is employed is not subject to any regular inspections by the postal service, such franking systems must be protected more extensively against fraud than are closed franking systems. Open systems, however, also must be significantly cheaper in order to be able to become popular in the mass market.

SUMMARY OF THE INVENTION

It is an object of the present invention to provide a franking method, a franking system, and a franking machine that exhibit high security against fraud at a low cost.

This object is achieved in a method, system and postage meter apparatus in accordance with the invention wherein fraud by multiple employment of postage fees and/or multiple employment of date stamps is prevented by the machine-readable date stamp that is applied on the postal matter during franking being encoded and/or fashioned such that it can be unambiguously distinguished from other date stamps that are employed. The date stamp thereby contains the imprint and/or value of an electronic coin individualized for the intended franking. Whereas standard money, for example coins and bank notes, are in fact standard payment means, the purpose of the payment, however, cannot be seen from such currency. In the present invention, however, money that has been individualized for the present franking—referred to below as electronic coin—is generated with the franking. This electronic coin not only contains a monetary value such as, for example, the postage value, but also contains individualized data about the franking, so that a double (duplicate) generation of an electronic coin is precluded. The electronic coin is represented on the postal matter by a date stamp that, in addition to containing the specification of the postage value also contains further particulars identifying the electronic coin, these being machine-readable. As a result, the postal service can check with an evaluation device as to whether a date stamp has already been employed and, for example, has been cut out from a used envelope by a defrauder and glued onto a new letter. The multiple employment of postage fees that are stored and debited in electronic form in such franking systems can be detected since it can be seen with reference to the date stamp whether it has been generated with a postage that has already been consumed. Insofar as the producer of the date stamp is contained in the date stamp (in non-manipulatable (encrypted) form), the counterfeiter can be identified. In both instances, postal matter franked with such fraudulent means can be precluded from being further conveyed.

Compared to known solutions, the inventive solution has the advantages that no additional hardware such as the aforementioned security device is required for storing and accounting the postage fees or for storing a user-individual signature key, and the invention can be realized on a conventional computer solely in software form. Further, it is not compulsory that data about the user be contained in the date stamp, in which case the user cannot be identified from the date stamp, and the anonymity of the user being thus preserved. It is also not required that, in addition to the user and the postal service, a third person—as monitoring entity—monitors the franking event and the accounting of the postage fees on line as in some known solutions; rather, franking can ensue at any time and without intervention of such a monitoring entity. Overall, the inventive solution achieves a security standard that is just as high as given cryptographically secure, electronic payment systems.

In an embodiment of the inventive method, the inspection ensues by comparisons of the date stamp to be inspected to date stamps stored in a data bank. The comparison check of the date stamp to be inspected is equivalent to a comparison test of generated, electronic coins. Since an individual date stamp, i.e. an individual electronic coin that also individualizes the piece of mail, is generated for each piece of mail, this represents a simple realization of the inspection. The data bank is contained in a suitable memory in the inspection device. Since, however, data banks do not exhibit unlimited memory capacity in practice, in an embodiment each data stamp includes an expiration date, i.e. a date in the future after the date of the production of the date stamp which defines the latest date for which the date stamp (or the electronic coin) is valid and up to which, for example, the piece of mail is also carried. This time span can, for example, be a standard fourteen days for all users and all date stamps (or electronic coins). This means that an electronic coin whose expiration has already expired as of the inspection can be separated out in a first stage of the inspection, and that only those used electronic coins need to remain stored in the data bank that have been inspected from a time span in the past calculated from the date of the inspection, i.e. during the last fourteen days. As a result, for example, memory capacity in the data bank is made re-available every day by erasing the date stamp or electronic coins having the oldest inspection dates.

The postage fees represented by an electronic coin can be stored as postage fee units, with each such postage fee unit being encoded with respect to a postal item for which the postage fee unit is to be employed. An inspection can then be conducted on the basis of the date stamp to determine whether the postage fee unit (electronic coin) was previously employed for franking a postal item.

A number of postage fee units can be combined for franking one postal item, and/or a postage fee unit can be composed of a number of electronic coins.

In order to enable the inspection of postage fees for multiple employment and to prevent counterfeiters from producing their own postage fee units without paying for them the postage fee units can be individually encoded by the postal service with a secret key. This encoding, which is different for each postage fee unit, is also included in the date stamp applied on the postal matter, so that a multiple employment of postage fee units is thus able to be recognized with reference thereto.

In a preferred embodiment of the invention, the production date and production time, the franked postage fee and the addressee of the postal matter are contained in non-manipulatable form in the date stamp. Other and/or further data such as, for example, the sender, the address of the sender or an expiration date for the postage fee also can be contained therein.

For capacity reasons it may be that not all frankings and date stamps are inspected. The inspection can be implemented only in the fashion of spot checks, in which case not all inspected date stamps are stored in the data bank, or a date stamp to be inspected is compared only to a part of the date stamps stored in the data bank. In order nevertheless to prevent fee stamp and date stamp from being separated from or cut out of a conveyed piece of mail, or being copied with a copier and being simply glued or copied onto the postal matter to be franked, further postal matter data can be co-incorporated in the date stamp. Such postal matter data can serve as an individual fingerprint of the postal matter to be franked and thus are different for each piece of mail. For example, the surface structure (surface fiber structure, roughness of the surface) of the packaging material or of the envelope or some other measurable property that individualizes the individual piece of mail such as, for example, the exact weight, can be employed as this postal matter data, Such data are either entered by the user or are automatically measured during franking with a measuring unit integrated into the franking machine.

In a further embodiment the postal matter data are artificially added to the postal matter in the form of label data situated on a label. Such a label can, for example, carry a hologram or a bar code with data integrated in the data stamp as the postal matter data. In a version of this embodiment a date stamp must also belong to the postal matter franked therewith and cannot be employed for some other postal matter that comprises different postal matter data. This can be identified in the inspection of the date stamp insofar as the inspection equipment is suitably fashioned for measuring or otherwise identifying the postal matter data of the postal matter to be inspected, and the measured postal data are then compared to the postal matter data contained in the date stamp.

Postal matter data, which are characteristic of the postal matter on which they are to be printed, can be contained in the date stamp or the electronic coin. Such postal matter data can characterize the physical properties of the postal matter on which it is printed. As described above, the data can identify the nature and/or surface structure of the packaging material of the postal matter, or can be data contained in a label applied to the postal matter.

Postage fees are stored in electronic form as electronic coins and are debited. An individual electronic coin that can be distinguished from other electronic coins for other postal items is applied to each postal item, in a manner which allows inspection for multiple use of the electronic coin (date stamp).

DESCRIPTION OF THE PREFERRED EMBODIMENTS

Figure 1:
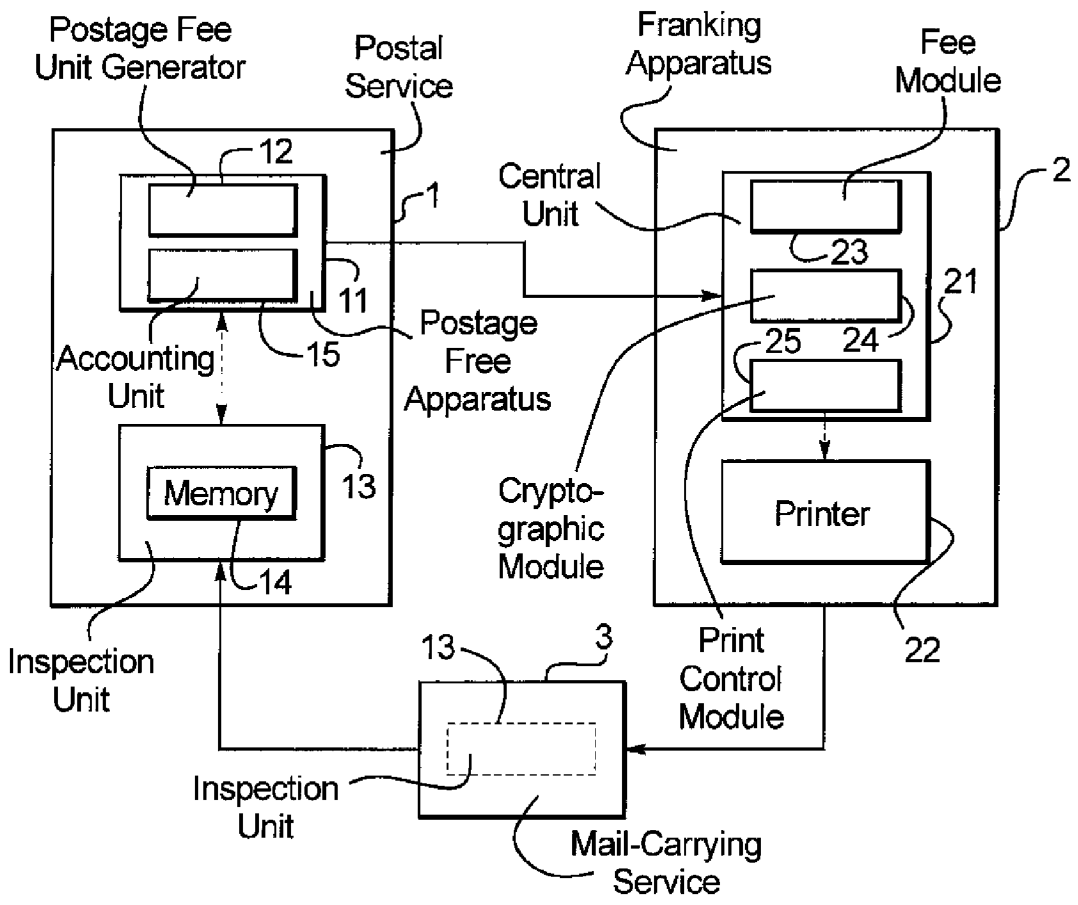
FIG. 1 is a block circuit diagram of an inventive franking system.

The franking and mail-carrying system shown in FIG. 1 involves a postal service 1, a franking apparatus 2 and a mail-carrying service 3. The postal service 1 includes a postage fee apparatus 11 for generating postage fee units and accounting such postage fee units, and an inspection unit 13 for inspecting and devaluing frankings. The postage fee unit 11, which need not necessarily be arranged in a Post Office but, for example, they can also be offered by a third party or through the Internet, makes postage fee units for franking postal matter available, these being able to be acquired or electronically downloaded at any time by the user of a franking machine. The postage fee units (i.e., electronic coins) are generated with a postage fee unit generator 12, the debiting and accounting ensue within an accounting unit 15.

Figure 8:
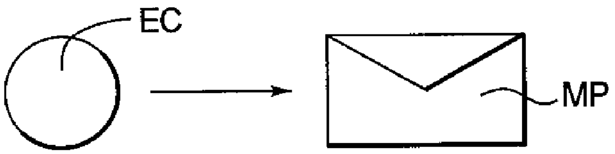
FIG. 8 schematically illustrates the use of electronic coins for respectively franking mail pieces on a one-to-one basis.
Figure 9:
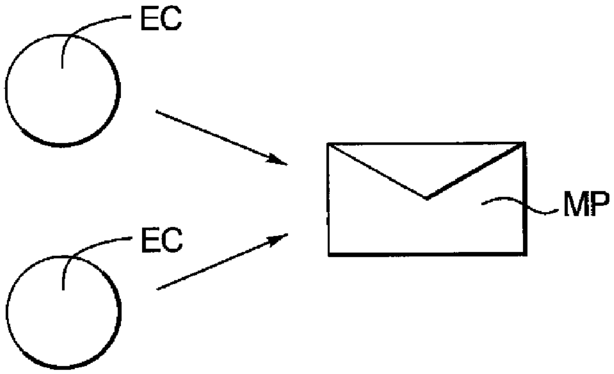
FIG. 9 schematically illustrates the use of multiple electronic coins for franking one mail piece.
Figure 10:
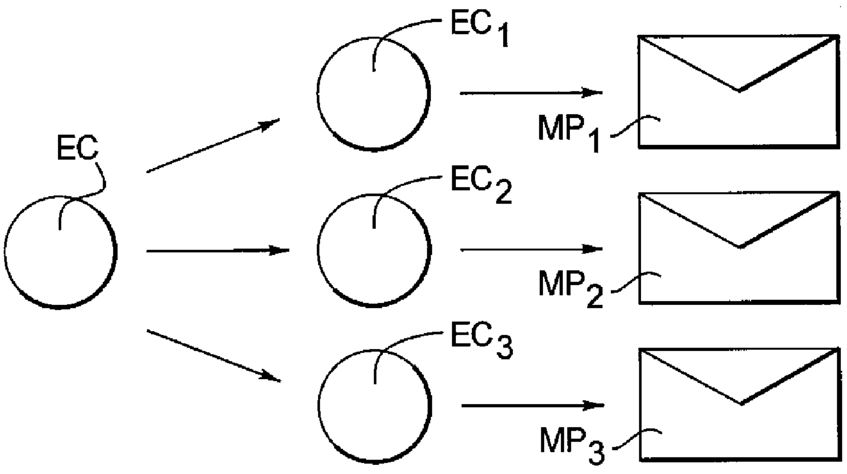
FIG. 10 schematically illustrates dividing an electronic coin into a number of sub-units, and respectively franking different mail pieces with the sub-units.

As schematically indicated in FIG. 8, one electronic coin EC can have the appropriate monetary value for franking one mail piece MP. In this embodiment, the electronic coins EC and the mail pieces MP correspond on a one-to-one basis. FIG. 9 illustrates the use of multiple coins EC combined to produce the total amount for franking one mail piece MP. FIG. 10 illustrates a further embodiment wherein an electronic coin EC is divided into a number of sub-units, in this case three sub-units $EC_1$. $EC_2$ and $EC_3$. These sub-units are then respectively used to frank different mail pieces $MP_1$, $MP_2$ and $MP_3$. The sub-units of the electronic coin EC, however, need not be of equal monetary values.

The franking apparatus 2 has a central unit 21 and a printer unit 22 that, in an open franking system, can be realized with a standard PC and a standard printer. The central unit 21 includes a fee module 23 that downloads the postage fee units from the postal service, stores them and internally debits them given a franking. The storage of postage fees can, for example, ensue on the hard disk of the PC, on a chip card or on some other storage medium. The accounting of postage fees by the postal service 1 usually ensues upon download of postage fees, whereas the internal accounting in the franking apparatus 2 ensues upon printout of a franking. The accounting by the postal service 1 can ensue with a separately established debiting account, by credit card, by electronic payment or by cash payment. In order to protect data for the generation of the date stamp against manipulation when franking a piece of mail, a cryptographic module 24 is also provided. A print control module 25 is provided that controls the printer unit 22. The fee stamp and the data stamp can either printed directly on the postal matter or can be printed on a label to be adhered to the postal matter. The franked postal matter is subsequently conveyed by a mail-carrying service 3, whereby it passes through an inspection unit 13 either at the carrier service 3 or in the postal service 1, for example in a mail collecting center, where the franking is inspected and devalued. To this end, the inspection unit 13 has a memory 14, wherein used date stamps are stored to which a date stamp to be checked is compared. There also can be a connection between the postage fee apparatus 11 and the inspection unit 13 in order, for example, to keep accounts about used and devalued postage fee units and to assure that the inspection unit 13 knows the encoding of postage fee units, that can change at regular time intervals.

The franking, which includes at least one fee stamp and a date stamp in the present case and that is generally referred to as Aindicium, should include at least the franked postage fee and an electronic signature for authorization of this postage fee. Additionally, further data can be provided in order to support specific functions of the mail-carrying system. For example, the delivery address can be contained in machine-readable form in order to enable automatic mail sorting. For anonymity, the identity of the center can be omitted. The machine-readable part of the franking can, for example, be printed in the form of a two-dimensional bar code. When a franking is valid and adequate, the postal matter is delivered to the corresponding recipient.

Such a franking and mail-carrying system must be protected against fraud insofar as possible; fee accounts of users must be protected against unauthorized access; data protection and anonymity must be assured within certain limits, and other security demands must be taken into consideration. These factors are explained in greater detail below.

At any point in time, the mail-carrying system should only carry as much mail as is covered by paid fees. As a sub-criterion, double employment of postage fees should be prevented: after a user has downloaded postage fees amounting to a value of x, the user should be able to print out a maximum of fee stamps whose total value does not exceed the value x. In open franking systems, the recipient address and a time mark are usually already contained in the date stamp, so that a renewed use of a franking that has already been employed is largely precluded, even without further cryptographic security measures. In closed franking systems, wherein the franking process is separate from the address in process, so that the recipient address is usually not contained in the date stamp, copies of frankings nonetheless can be detected by, as in the inventive system, comparing frankings, i.e. the date stamp of a franking, to frankings that have already been used and are stored in a data bank upon being inspected. If a date stamp is detected for a second time, then the postal matter franked therewith either can be charged a punitive postage and sent back to the sender, or can be precluded from mail-carrying. As a further protective measure to prevent copying of frankings, red fluorescent ink can be employed for the fee and/or date stamp, this being very difficult to reproduce with conventional copiers. In order to identify a user who illegally employs a postage fee unit multiple times for franking, the date stamp can contain data about this user in non-manipulatable form, for example the number of the user=s postage fee account or a specific user code.

Insofar as it is possible to use the date stamp to identify a user who illegally multiply employs frankings and/or postage fee units, protective measures must be undertaken so that a correctly behaving user is not erroneously accused of such misbehavior.

Frankings should not reveal whether they derive from the same user except when the sender/user wishes this. Moreover, the user's identity should not be derivable from the franking, in order to enable the anonymous dispatching of postal matter. Thus, a linking of date stamps by comparing the users should also be prevented.

In addition to the described security demands, a franking system should also offer adequate operating ease. After downloading postage fees to a value of x, the user should have the possibility of generating any desired fee value (maximally x). Moreover, the procedure of acquiring postage fee units and of generating frankings should be independent of one another, so that an online connection to a postage fee means need not first be produced as in known systems for generating a franking in order to download a postage fee that is directly converted into a franking. Franking thus should also be possible offline and without intervention of a third entity that monitors the franking and the accounting of the postage fees.

With the inventive method and the illustrated inventive system, the described security demands and the described operating ease can be achieved. Due to the individual design of the date stamp such that, for example, a different type of date stamp is required everyday for each addressee, repeat employment of frankings can be largely precluded. A defrauder who has sent a postal item to a specific recipient could re-employ the franking a second time only for a second sending on the same day. Since the date stamp is compared in the inspection units to date stamps that have been already used and are stored in the data bank, frankings that are employed for a second time can be detected with high reliability. If the date stamp is fashioned such that data about the identity of the user are contained therein, this user also can be identified in case of fraud. Since the date stamp also contains a code from which the postage fee units employed for generating the franking can be identified, an identification also can be made in the inspection as to whether the corresponding postage fee units have already been used for earlier production of a franking, and thus have been consumed. Since the postage fee units can be acquired at any time and independently of the point in time of a franking to be undertaken, and can be downloaded at that time and can be subdivided into smaller sub-units, and can be combined to form larger units, the required operating ease is also achieved.

Figure 2:
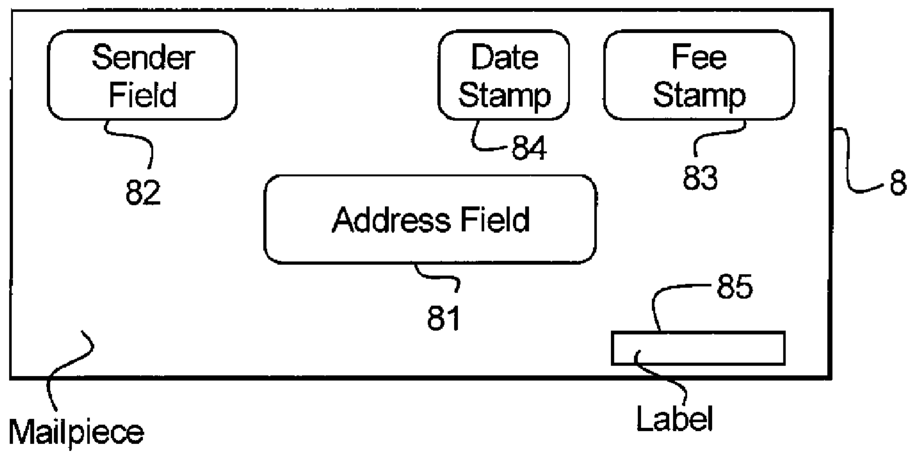
FIG. 2 shows a piece of mail franked according to the inventive method.

In FIG. 2, a piece of mail 8, an envelope in the example, is shown with an inventive franking and address. This includes an address field 81 for the address, an optional sender field 82 for the return address, a fee stamp 83, a date stamp 84 and a label 85. The label 85 is optional and serves as a fingerprint for the piece of mail, to which end label data contained on the label are likewise contained non-manipulatable form in the date stamp 84. This is intended to prevent the fee stamp 83 and the date stamp 84 from being cut out or copied and glued onto another piece of mail and illegally re-employed. To achieve such re-use, the label 85 also would have to be re-employed together with the date stamp 84. The label 85, for example, can be designed such that it is destroyed upon separation and/or cannot be copied, such as, for example, with holograms, watermarks, relief impressions, etc. Moreover, the date stamp 84 can be fashioned such that it is machine-readable, the address of the addressee being contained therein and can be employed for machine sorting of the postal matter. In this case, the franking could be employed only for postal matter directed to one addressee. The arrangement, size and design of the individual fields 81 through 85 can, of course, ensue differently from that shown.

Figure 11:
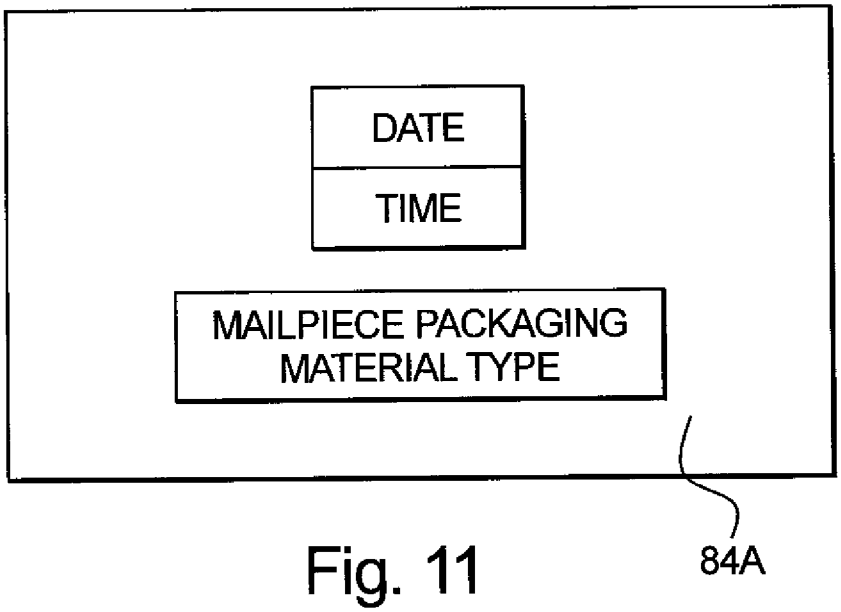
FIG. 11 schematically illustrates an embodiment of the date stamp that can be used in accordance with the present invention.
Figure 12:
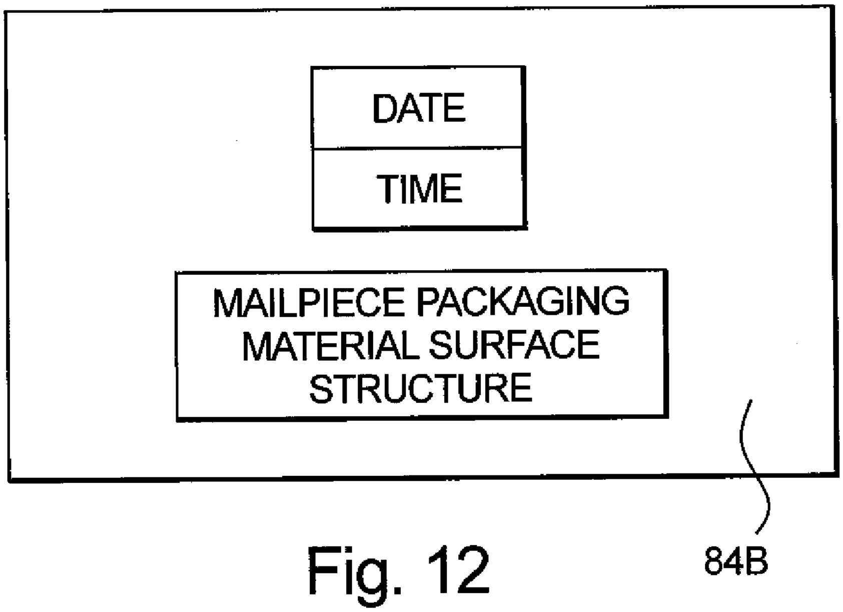
FIG. 12 schematically illustrates a further embodiment of the date stamp that can be used in accordance with the present invention.

For example, the date stamp 84 can include postal matter data that characterizes a physical property of the mail piece on which the date stamp is stamped. If the date stamp is cut out from one mail piece and attempted to be affixed to another mail piece, it is unlikely that the second mail piece will have identical physical properties as the original mail piece. In the example shown in FIG. 11, an embodiment of a date stamp 84 A is shown wherein the postal matter data characterize a type of packaging material of the original mail piece. In the embodiment of the date stamp 84B shown in FIG. 12, the postal matter data characterize the surface structure of the packaging material of the original mail piece.

For explaining individual events in the inventive method, protocols having individual protocol steps are shown in FIGS. 3 through 6. For understanding these protocols, which are essentially based on the difficulty of calculating discrete logarithms, some of the designations and definitions employed shall be explained first. The notation is similar to the notation employed in U.S. Pat. No. 5,521,980 that discloses an electronic payment system and which is herewith expressly referenced in view of further explanations regarding the system of denotation and further definitions.

The following meanings apply: Z the set of whole numbers, q a prime number, G a family of finite, multiplicative Abelian groups $G_q$ of the order q. For a given group $G_q$, further, let power $G^x$ with ($g \in G_q$ and $x \in Z$) be defined by repeated multiplication in $G_q$. For a given generator G of the group $G_q$ and an element $Z \in G_q$, the smallest non-negative, whole number is x, insofar as it satisfies $z=g^x$, (discrete logarithm of z with respect to g). For general/generators $g_1, \ldots, g_l \in G_q$, then a doublet $(x_1, \ldots, x_l)$ satisfies $z=\Pi_{i=1}^{l} g_i^{x}i$ (a discrete representation of z with respect to $g_1, \ldots, g_l$).

Families of groups $G_q$ are used below that have efficient algorithms for multiplying group elements, uniformly distributed, random selection of group elements, and testing of two group elements for equality. Moreover, it is assumed that the calculation of discrete logarithms is difficult, i.e. it is not possible in polynomial form in the bit length of q. Although the last property has not been documented for any family of groups, there are candidates to which these properties are ascribed after intense research over several decades. This is called discrete logarithm assumption or discrete representation assumption. The two are equivalent.

Large cyclical sub-groups of the multiplicative groups $Z^*_p$ of finite bodies of residues modulo of a large prime number p are one candidate. Large means that p is at least 1024 bits long. Other candidates (that, however, have not been investigated as long) are families of specific elliptic curves, large sub-groups of elliptic curves to be more precise. The elliptic curves should not be super-singular and of a low family. There are concrete recommendations from, for example, the National Institute of Standards and Technology (NIST) [NIST99] (csrc.nist.gov/encryption). The current state of research is that the calculation of discrete logarithms given the former candidate and a modulo length of 1024 bits is about as difficult as calculating discrete logarithms in the latter candidate given a curve order of approximately 160 bits. The multiplicative notation of $G_q$ is employed below. This notation can be easily translated into the additive notation that is standard given elliptical curves in that multiplications in $G_q$ are replaced by addition and powers in $G_q$ are replaced by scalar multiples of points of a curve.

The protocols shown in FIGS. 3 through 6 are written in the notations standard for algorithms: with a declaration and a definition. A protocol declaration, which is shown in the first line of each figure, is composed of the formal output parameters, followed by an allocation arrow followed by the protocol name and the formal input parameters in brackets. In order to improve the legibility, all input and output parameters of a participant are enclosed in square brackets, whereby the abbreviation of the participant (S for user, P for postage fee apparatus) is attached to the brackets as a superscript. Formal input parameters can be taken from one protocol participant alone or from all protocol participants in common. The former are called private inputs, the latter are called common inputs. The protocol definition ensues in matrix notation, whereby the actions of each participant are written in columns below one another, and each column is headed by the participant name. Successively ensuing actions of a participant can be combined to form blocks.

Protocol actions are written in the standard mathematical notation with a few specific symbols. The uniformly distributed, random selection of an element from a set A and the allocation of this element to a variable a is referenced $a \in_R A$. The evaluation of an expression E and subsequent allocation of the result to "a" is referenced $a \leftarrow E$. H references a pseudo-random hash function that returns a value from $Z_q$ after input of an arbitrary, binary character sequence. H can be written with an arbitrary number of arguments. In this case, the input H is the concatenation of the binary representations of all arguments. Arithmetic operations are written either in $G_q$, i.e. multiplication mod p, or in $Z_q$, i.e. addition and multiplication mod q. Multiplication and exponentiation $G_q$ are the most frequent operations below. This operation is written without the supplement "mod p". The addition and multiplication in $Z_q$ is respectively given the supplement "mod q", so that it is clear in every instance what operation is meant. When a participant of a protocol sends the value of its variable "a" to another participant, then an arrow (referenced "a")

Figure 3:
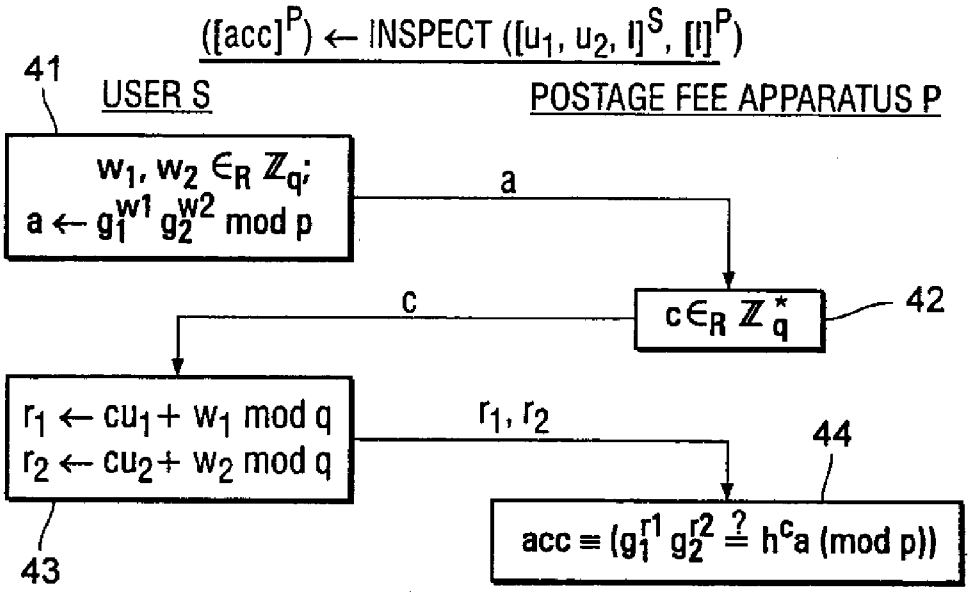
FIG. 3 illustrates the protocol processed until a postage fee account is opened in accordance with the invention.
Figure 4:
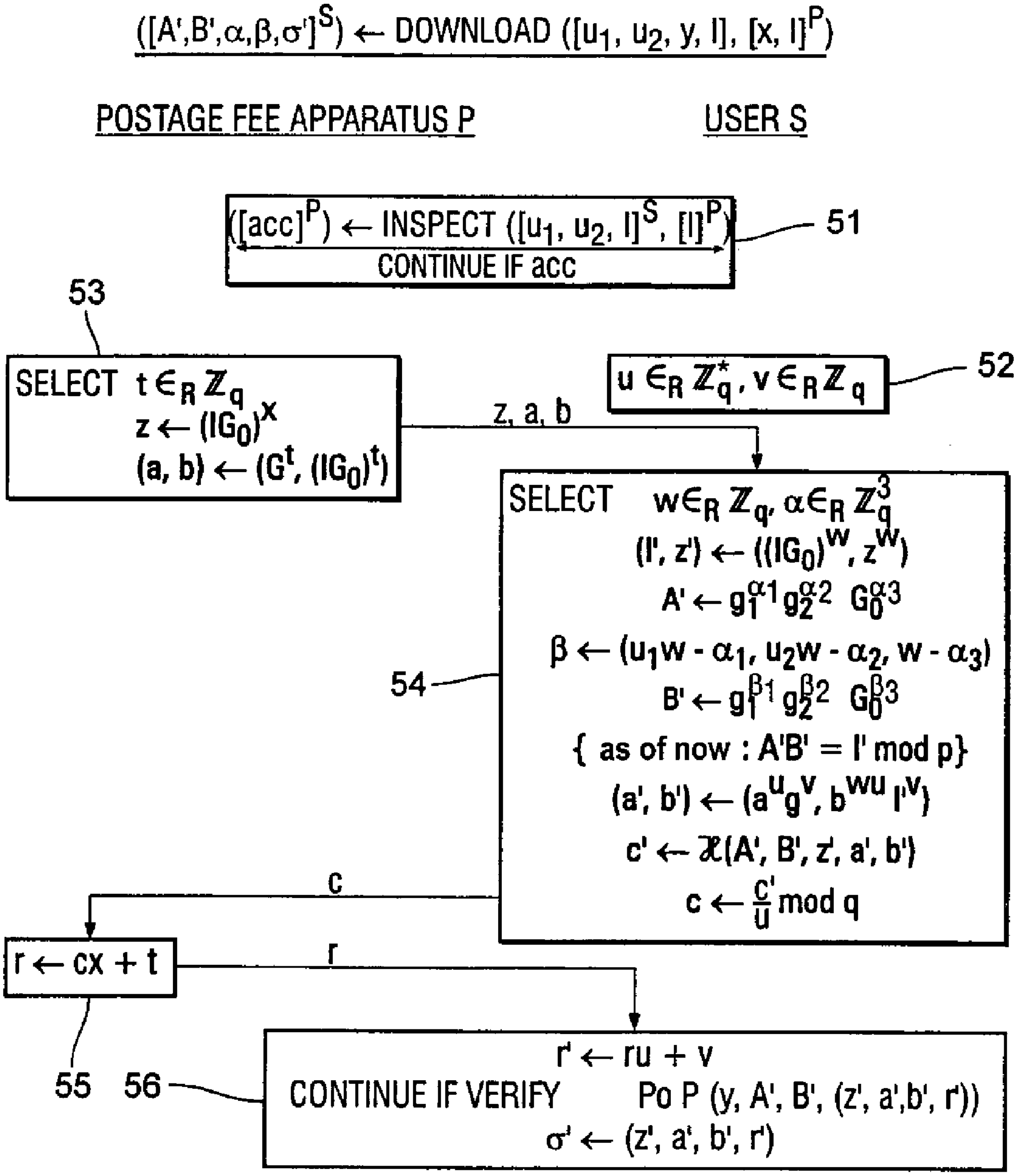
FIG. 4 illustrates the protocol processed for the download of a postage fee unit in accordance with the invention.

$\xrightarrow{a}$ points from the column of the sending participant to the column of the receiving participant (see FIGS. 3 and 4). Designations of protocols or algorithms are referenced in the standard notation. The expression "proceed if P" with P as boolean predicate denotes that the protocol implementation proceeds only if P is valid. Otherwise, the protocol is ended and the unit executing the protocol emits an error message.

In the following protocols, p references a large prime number, q references a large deviser of p−1 and $G_q$ references the unambiguous sub-group of the multiplicative group of the body $Z_p$ that has the order q. Further, let $g_1$, $g_2$, G, $G_0$ be four generators of $G_q$ that are selected independently of one another and uniformly distributed randomly at the system start. The postage fee means P selects a private key $x \in Z_q^*$ are securely uniformly distributed and then calculates the corresponding public key $y=g^x \bmod p$. Digital coins (also called "piece of postage" (PoP)) are doublets (A, B, σ), whereby A, B $G_q$ and σ=(z,a,b,r) (a digital signature from the range $G_0 x \times Z_q$.). A digital coin is valid with respect to a public key y when it satisfies the following equation:

$$\text{VERIFIERPoP}(y,A,B,(z,a,b,r))=(G^r=(ya_1)^c b_1 \Lambda m^r=(za_2)^c b_2)(1) \text{ with } \sim c=H(A,B,z,a,b)$$

Indicia or date stamps are doublets (A,B,(z,a,b,r)s,rcpt,d/t), in their digital form, whereby the first part (A,B,(z,a,b,r)) is a digital coin and the second part (s,rcpt,d/t) specifies the service that can be paid with this indicium. $s \in Z_q^3$ is an auxiliary value that enables the de-anynomyzation of the user in case of fraud, rcpt is the recipient and d/t the date of production and the production time of the indicium. Further data about the source of the indicium can be attached. A date stamp is valid when the following equation is satisfied:

Before a user S can open a postage fee account, the user S must select a private, digital identity $(u_1, u_2) \in Z_q^{*2}$ arbitrarily uniformly distributed and must select an appertaining, public digital identity $I=g_q^{u}\sim g_2^{u2} \bmod p$. Subsequently, the user S identifies himself to the postage fee apparatus P, for example with a personal identification, and opens an electronic postage fee account. The user S employs the user>s public digital identity I as the account number. As proof the supplied digital identity I is the proper, public identity for that user, the user S proves that the user S knows a discrete representation of I with respect to the generators $g_1$, $g_2$ (namely, the user>s private digital identity $(u_1,u_2)$) without showing this discrete representation to the postage fee apparatus. This occurs in the blocks 41 through 44 of FIG. 3 (described below) in $$\text{VERIFIER}\sim Ind(y,A,B,(z,a,b,r)s,rcpt,d/t)\sim\equiv\sim(AB\neq\sim 1\sim\Lambda\sim g_1^{s1} g_2^{s2}\cdot G_0^{s3}=AB^{c)(2)} \text{ with } \sim c=H(A,B,z,a,b,r,rcpt,d/t)$$

an interactive way between the user S and the postage fee apparatus P. When the postage apparatus P accepts the identification and the protocol is successfully executed (acc=true), then a new postage fee account with number I is opened in the name of the user S.

FIG. 4 shows a protocol that is executed for downloading digital coins. A common input is the account number I and the public key y of the postage fee apparatus. Private input of the postage fee apparatus P is its private key x. The private input of the user S is the user=s private digital identity $(u_1,u_2)$. First, the user proves that the user has a discrete representation of I (block 51). The protocol is shown in FIG. 3. The postage fee apparatus P and the user S take the common input I, and the user S takes the user=s private digital identity $(u_1,u_2)$ as a private input. The user S then selects two values $w_1,w_2 \in_R Z_q$ that are arbitrarily uniformly distributed, and calculates $a \leftarrow g_1^{w_1} g_2^{w_2} \bmod p$ (block 41). This value (a) is sent to the postage fee apparatus P, which subsequently selects a value $c \in_r Z_q^*$ that is uniformly arbitrarily distributed and sends it to the user S (block 42). In response, the user S replies with the value pair. $r_1 \leftarrow cu_1+w_1 \bmod q$ and $r_2 \leftarrow cu_2+w_2 \bmod q$ (block 43). When the value pair returned by the user S satisfies the equation, $g_1^{r_1} g_1^{r_2}=h^c a$, $(g_1^{r_1} g_2^{r_2}=h^c a \pmod p)$ (i.e. the equality is true as indicated by acc in block 44 then the postage fee apparatus P accepts I as the public digital identity of the user S and, thus, as account number. This is indicated in block 51 as an inspection $([acc]^P)$ of $([v_1, u_2, I]^s, [1]^P$, with the procedure continuing if true (acc). Next, the user selects the values $u\sim\in_R Z_q^*$~and ~$v \in_R Z_q$~that ~are randomly uniformly distributed, according to block 52. At the same time, the postage fee apparatus P selects a value $t \in_R Z_q$ and subsequently calculates the components $z \leftarrow (IG_o)^x$ and $(a, b) \leftarrow (G^t, (IG_o)^t)$ according to block 53. The postage fee apparatus P sends z,a,b to the user S. In response, the user S selects further values $w \in_R Z_2^*$ and $\alpha=(\alpha_1,\alpha_2,\alpha_3) \in_R Z_q^3$ that are $\alpha=(\alpha_1,\alpha_2,\alpha_3) \in_R Z_q^3$ randomly uniformly distributed. The user S then successively calculates the values I', z', A', B', a', b', c' according to the equations in block 54. Next, the user S sends the value c to the postage fee apparatus P that replies for the value $r \leftarrow cx+t$ according to block 55. Finally, the user S calculates the value r= and accepts the received, digital coin (A=,B=,(z=,a=,b=,r=)) when it is valid (see Equation (1) above) with respect to the public key y of the postage fee apparatus P (see block 56). Moreover, the user S stores the discrete representation α, β of A and B for the digital coin that was received.

Figure 5:
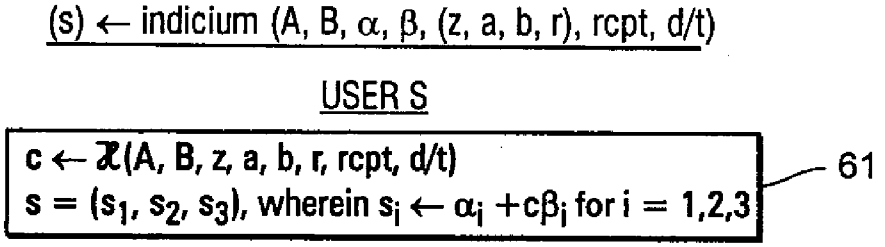
FIG. 5 illustrates the protocol processed for generating a date stamp in accordance with the invention.
Figure 6:
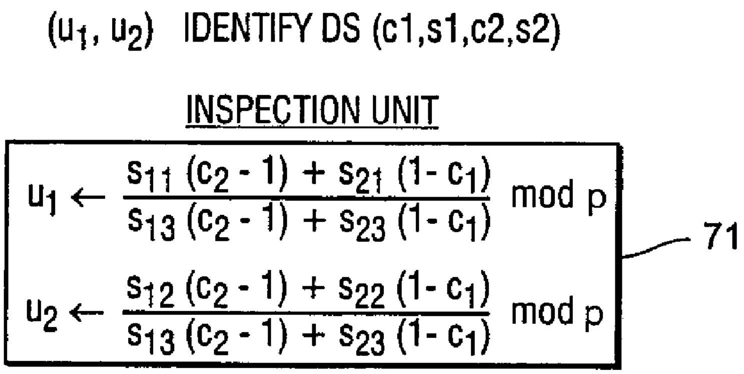
FIG. 6 illustrates the protocol processed for detecting repeat employment of a postage fee unit in accordance with the invention.

When the user S wishes to frank a postal item, the user S selects a suitable digital coin (A,B,(z,a,b,r)) and calculates the corresponding indicium (s)←indicium (A,B,z,a,b,r,rcpt,d/t). The recipient rcpt of the postal item enters into this calculation, as do the date and the time of the production d/t of the indicium and, if necessary further relevant data. In addition to the postage fee unit, the user S must also enter the corresponding, discrete representations α, β of A or B. FIG. 5 shows the calculations that the user S carries out (block 61).

When a postal item franked in this way proceeds to the inspection unit 13, the indicium can be verified according to the above equation (2). The inspection unit 13 can be set as to the percentage of passing postal matter that is inspected. When a user uses a received, digital coin for the purpose of generating more than one indicium, and thus more than one franking, even though the digital coin is only fashioned for franking a single piece of mail, then the inspection unit 13 can recognize this double use by identifying thereto that the components A, B have been used in an indicium that was inspected earlier. In this case, let the two indicia be referenced $c_1$, $c_2$ and the corresponding s-component be referenced as $s_1=(s_{11}, s_{12}, s_{13})$ and $s_2=(s_{21}, s_{22}, s_{23})$. The inspection unit 13 can then determine the private, digital identity $(u_1,u_2)$ of the fraudulent user with the calculating step shown in block 71 of FIG. 6 and can derive the account number $I=g_1^{u_1} g_2^{u_2} \bmod p$ of the fraudulent user.

In the inventive franking method and the inventive franking system, no additional hardware is required for a security module for securing and debiting postage fees; rather, realization is possible with a conventional computer and printer. As a result, such a system can be realized significantly more economically for making the system of interest for a larger mass market. At the same time, however, high security demands are satisfied. It is also possible to realize the basic method steps solely with software that can be replaced and updated. It is not necessary that each user have an individual key pair, for example for a digital signature system. The users and the inspection unit must merely know the public key of the postal service, or of the postage fee apparatus. This, for example, can be published on an Internet page of the postal service and the appertaining public certificates can be integrated in a standard web browser. In contrast thereto, each user has its own, individual signature key in the conventional solutions, thereby requiring that the postal service either administer and store the corresponding verification keys or that each date stamp contain the corresponding verification key and the verification certificate. When, given the conventional solutions, a defrauder succeeds in breaking the signature key of a security means of the user, the defrauder can arbitrarily generate frankings without risk of discovery. In contrast to this hardware protection in the conventional solutions, which are intended to prevent theft from the security means, with cryptographic protection is assured in the inventive solution. Moreover, further security demands and desires for operating ease can be realized more simply and more economically in the inventive solution.

Figure 7:
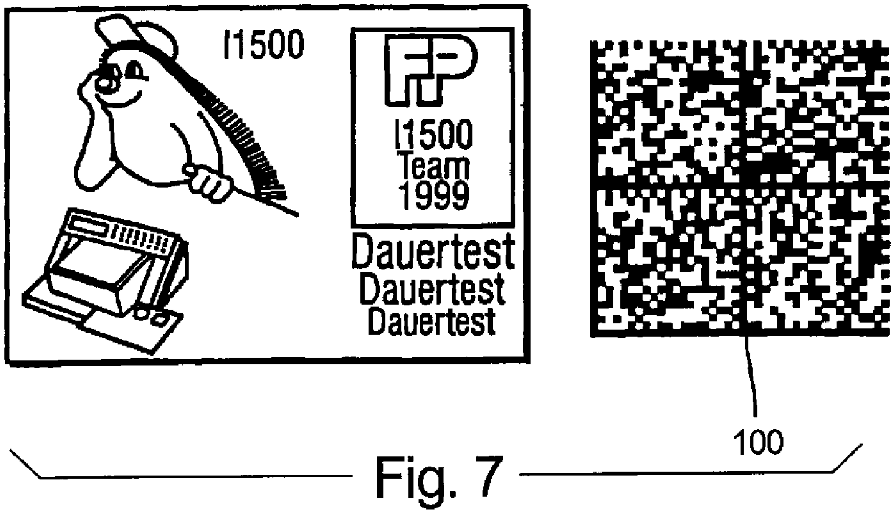
FIG. 7 shows an exemplary imprint (of a date stamp or of an electronic coin) having a data matrix of 40×40 elements produced in accordance with the invention.

FIG. 7 shows a test imprint of a data stamp with a data matrix of 40×40 elements, i.e. the smallest data set of the options. The printed date stamp is machine-readable and contains the electronic coin, the value thereof as well as the expiration date thereof as well as further particulars that individualize the franking. The data matrix 100 can, of course, also be formed of some other element number of m×n elements. A standard advertising imprint is shown to the left next to the printed data matrix 100.

A method for machine franking of postal matter and for inspecting the franking has been described above. The inventive concept, however, can be utilized everywhere in electronic commerce (e-commerce, IE-cash systems); for example, it is possible without further difficulty for services such as, for example, the preparation of cards and tickets (theater tickets, travel tickets, etc.) can be handled with the invention in decentralized and open systems. When, for example, a travel ticket is generated by the user of the travel ticket, then the travel ticket imprint contains all data of the travel ticket-individual electronic coin. Since each travel ticket is individualized, multiple employment of the travel ticket is precluded.

Although modifications and changes may be suggested by those skilled in the art, it is the intention of the inventor to embody within the patent warranted hereon all changes and modifications as reasonably and properly come within the scope of his contribution to the art.

I claim as my invention:

1. A system for franking postal matter with a franking apparatus and for inspecting the franking comprising: a franking apparatus that franks postal matter, having a printing unit a machine-readable date stamp onto items of postal matter, a central unit containing a fee module, storing and debiting postage fees to be included in said date stamp, and having a print control module that controls said printing unit; a postage fee apparatus engageable in a communication protocol with said franking apparatus that makes postage fee units electronically available to said franking apparatus as electronic coins each having unique coin identification information embodied therein, said electronic coins being entered in said communication protocol into said fee module of said central unit and said unique coin identification information being incorporated in said date stamp on one of said items together with the electronic coin associated with the unique coin identification information by said printing unit, to individualize the date stamp compared to other date stamps; and an inspection unit remote from said franking apparatus that inspects said items, including a memory that stores respective date stamps on successively inspected items of postal matter, by comparing the unique coin identification information in the date stamp on a currently inspected item of postal matter with said stored date stamps to determine whether the date stamp on the currently inspected item of postal matter has been previously used to determine, from said unique coin identification information, whether said date stamp has been multiply used.

2. A system as claimed in claim 1 wherein said apparatus includes a cryptographic module for encrypting said data included in said date stamp, and wherein said inspection unit decrypts said data for determining whether said date stamp has been multiply used.

3. A system as claimed in claim 1 wherein said postage fee apparatus makes such postage fee unit available as respective electronic coins, with each electronic coin being individualized for inclusion in the date stamp for a respective item of postal matter, so that said electronic coins differ from each other when printed in said date stamp.

4. A system as claimed in claim 3 wherein said postage fee apparatus encrypts said postage fee units.

5. A method for franking mail pieces and for inspecting the franking, comprising the steps of:

obtaining postage fee units as electronic coins in an electronic protocol between an electronic coin source and a user of said electronic coins that individualizes each electronic coin by embodying information in each electronic coin that is unique for that electronic coin;

electronically storing said electronic coins in a device allocated to said user;

franking mail pieces with said device with respective postage fees comprised of at least one of said postage fee units, and debiting said electronic coins in said device as said postage fee units are consumed as said mail pieces are franked;

when franking each of said mail pieces, applying a machine-readable date stamp thereto at said device that includes an individualized electronic coin used for a postage fee unit consumed for franking that mail piece;

electronically storing the electronic coin in the date stamp on the mail piece; and inspecting the mail piece at a location remote from said device inspecting subsequent mail pieces by comparing the electronic coin in the date stamp thereon to the stored electronic coin to determine whether the electronic coin in the date stamp on the mail piece has been multiply used.

6. A method as claimed in claim 5 wherein the step of obtaining postage fee units as electronic coins comprises including an expiration date in said information embodied in each electronic coin, and wherein the step of electronically storing said electronic coins comprises storing said electronic coins in said device only up to the respective expiration dates of said electronic coins.

7. A method as claimed in claim 5 wherein the step of franking said mail piece comprises individually encoding each postage fee unit in a mail piece-specific manner that is unique for the mail piece for which the postage fee unit has been consumed, and wherein the step of applying a machine-readable data stamp comprises embodying said encoding in said date stamp on the mail piece, and wherein the step of inspecting the mail piece comprises using said encoding to determine whether said electronic coin has been multiply used.

8. A method as claimed in claim 5 wherein the step of franking a mail piece comprises combining a plurality of said electronic coins respectively representing a plurality of postage fee units totaling the postage fee for the mail piece.

9. A method as claimed in claim 5 wherein the step of franking a mail piece comprises dividing a postage fee unit represented by one of said electronic coins into a plurality of postage fee sub-units, and franking different mail pieces with the respective postage fee sub-units.

10. A method as claimed in claim 5 wherein the step of obtaining postage fee units as electronic coins comprises, in said electronic protocol, obtaining a secret key available only from said electronic coin source, and including information related to said secret key in the information embodied in each electronic coin that is unique for that electronic coin.

11. A method as claimed in claim 5 wherein the step of applying a machine-readable date stamp comprises including, in said date stamp, machine-readable information designating at least one of a production date of the date stamp, a production time of the date stamp, said postage fee, and an address.

12. A method as claimed in claim 5 wherein the step of applying a machine-readable date stamp comprises including in said date stamp, in addition to said electronic coin, machine-readable mail piece data characterizing a physical property of the mail piece on which said date stamp is applied.

13. A method as claimed in claim 12 wherein the step of including machine-readable mail piece data in said date stamp comprises including machine-readable mail piece data characterizing a type of packaging material of said mail piece.

14. A method as claimed in claim 12 wherein the step of including mail piece data in said date stamp comprises including mail piece data in said date stamp characterizing a surface structure of packaging material of said mail piece.

15. A method as claimed in claim 12 wherein the step of including mail piece data in said date stamp comprises printing a label carrying said mail piece data and adhering said label to said mail piece.

16. A method as claimed in claim 5 wherein the step of obtaining postage fee units as electronic coins comprises obtaining postage fee units as electronic coins all of equal monetary value.

* * * * *